United States Patent
Jones et al.

(10) Patent No.: US 8,140,630 B2
(45) Date of Patent: Mar. 20, 2012

(54) PUBLISH/SUBSCRIBE MESSAGE BROKER FOR MESSAGE SEQUENCES

(75) Inventors: Gareth E. Jones, Winchester (GB); Matthew R. Whitehead, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/365,409

(22) Filed: Feb. 4, 2009

(65) Prior Publication Data

US 2009/0228563 A1    Sep. 10, 2009

(30) Foreign Application Priority Data

Mar. 5, 2008 (EP) .................................. 08152331

(51) Int. Cl.
*G06F 15/16* (2006.01)

(52) U.S. Cl. ................... 709/206; 709/202; 709/203

(58) Field of Classification Search .................. 709/202, 709/203, 206
See application file for complete search history.

(56) References Cited

U.S. PATENT DOCUMENTS

| | | | |
|---|---|---|---|
| 2002/0174234 A1 | 11/2002 | Trovato et al. | |
| 2003/0018716 A1 | 1/2003 | Webb et al. | |
| 2004/0054729 A1 | 3/2004 | Fukuizumi et al. | |
| 2004/0078432 A1 | 4/2004 | Manber et al. | |
| 2005/0021622 A1* | 1/2005 | Cullen | 709/204 |
| 2006/0167897 A1* | 7/2006 | Jones et al. | 707/10 |
| 2008/0127209 A1* | 5/2008 | Gale et al. | 719/313 |

* cited by examiner

*Primary Examiner* — Mohamed Wasel
(74) *Attorney, Agent, or Firm* — Cuenot, Forsythe & Kim, LLC (57) ABSTRACT

A method of operating a publish/subscribe message broker. A method in accordance with an embodiment includes receiving a message on a topic from a publisher, identifying the message as a start of a sequence of messages, transmitting the message to one or more existing subscribers to the topic, registering a new subscriber to the topic, receiving a further message on the topic from a publisher, and transmitting the further message to the one or more existing subscribers to the topic, but not to the registered new subscriber to the topic. Following the identifying of the message as a start of a sequence of messages, the message broker creates a new sub-topic corresponding to the sequence of messages and subscribes the one or more existing subscribers to the new topic. Any new messages received that relate to the sequence are published to the sub-topic and not the original topic. Any new subscribers to the topic are not subscribed to the sub-topic.

19 Claims, 6 Drawing Sheets

PUBLISH/SUBSCRIBE MESSAGE BROKER FOR MESSAGE SEQUENCES

FIELD OF THE INVENTION

The present invention relates to a method of operating a publish/subscribe message broker, the message broker itself, and to a computer program product on a computer readable medium for operating the publish/subscribe message broker.

RELATED ART

Publish/subscribe (pub/sub) is an asynchronous messaging paradigm. In a pub/sub system, publishers post messages to a message broker and subscribers register subscriptions with that broker. In a topic-based system, messages are published to topics which are hosted by the broker. Subscribers in a topic-based system will receive all messages published to the topics to which they subscribe and all subscribers to a topic will receive the same messages. Pub/sub is a very valuable paradigm, each pub/sub message being routed according to properties of the message itself (typically topic, sometimes content). As each message arrives, as first step, the broker analyzes the message and determines the correct set of subscribers, and a second step distributes the message accordingly. The system is asynchronous. Currently, in publish subscribe environments, publishers can publish messages to a topic on which subscribers can receive messages. In some scenarios it would be useful to redirect both publications and subscriptions from the specified topic to another.

SUMMARY OF THE INVENTION

According to a first aspect of the present invention, there is provided a method of operating a publish/subscribe message broker comprising: receiving a message on a topic from a publisher, identifying the message as a start of a sequence of messages, transmitting the message to one or more existing subscribers to the topic, registering a new subscriber to the topic, receiving a further message on the topic from a publisher, and transmitting the further message to the one or more existing subscribers to the topic, but not to the registered new subscriber to the topic.

According to a second aspect of the present invention, there is provided a publish/subscribe message broker arranged to: receive a message on a topic from a publisher, identify the message as a start of a sequence of messages, transmit the message to one or more existing subscribers to the topic, register a new subscriber to the topic, receive a further message on the topic from a publisher, and to transmit the further message to the one or more existing subscribers to the topic, but not to the registered new subscriber to the topic.

According to a third aspect of the present invention, there is provided a computer program product on a computer readable medium for operating a publish/subscribe message broker, the product comprising instructions for: receiving a message on a topic from a publisher, identifying the message as a start of a sequence of messages, transmitting the message to one or more existing subscribers to the topic, registering a new subscriber to the topic, receiving a further message on the topic from a publisher, and for transmitting the further message to the one or more existing subscribers to the topic, but not to the registered new subscriber to the topic.

According to an embodiment, it is possible to provide a message broker that will operate a topic so that new subscribers will not receive messages from the topic, if that topic has already begun a sequence. Further, the topic used by both publishers and subscribers can be redirected to one or many different topics without client knowledge.

One particular situation in which this is useful is when publishing a sequence of messages that must all be received to make any sense, i.e., receiving all but one message would not be useful. Consider games of chess where publishers publish each move in the game to a particular topic. It would not make sense for subscribers to receive these publications half-way through a game as they would make no sense without the previous messages (in order for the subscriber to understand the current location of all pieces on the board).

In an embodiment of the method of operating the message broker, the step of identifying the message as a start of a sequence of messages, comprises accessing the content of the received message and identifying the message as a start of a sequence of messages from the accessed content of the message. The message broker has to identify when a new sequence of messages has started. One way that this can be readily achieved, is to look at the content of the received message for an explicit or implicit marker within the content of the message, which indicates that the message is the start of a new sequence. For example, the publisher can include within the body of the message a predetermined flag that indicates to the message broker that this message is the first message of a new sequence. If there is no flag, the message broker may be intelligently configured to determine from the content of the message that the message is the start of a sequence. For example, in the example above, of a topic maintained around the moves of chess games, then the presence of, for example, "1. e4", or something similar will indicate a new sequence. The identification of the message as the start of a new sequence may be based on something other then the content of the message, for example, on the location of the publisher, or the time at which the message was sent (relative to the time a previous message was sent perhaps).

The method of operating the message broker further comprises receiving a yet further message on the topic, identifying the yet further message as an end of the sequence of messages, and transmitting all future messages on the topic to the one or more existing subscribers to the topic, and to the registered new subscriber to the topic. The message broker can also be configured to identify the end of the sequence, and effectively terminate the special operating procedure associated with the sequence condition. Once the end is determined, then all subscribers are returned to the same footing, and any new messages received on the topic will now be sent to all subscribers, whether old or new. If another message is received that starts a new sequence, then the process can start over again.

In an embodiment, the method of operating the message broker further comprises, following the step of identifying the message as a start of a sequence of messages, creating a new topic corresponding to the sequence of messages and subscribing the one or more existing subscribers to the new topic. This can then include further determining, for all future messages received on the topic, whether to publish each message on the topic or on the new topic. This is one way in which the message broker can implement the separation of the new subscribers from the existing sequence of messages. The message broker creates a new sub-topic corresponding to the sequence of messages and subscribes the one or more existing subscribers to the new topic. Any new messages received that relate to the sequence are published to the sub-topic and not the original topic. Any new subscribers to the topic are not subscribed to the sub-topic.

BRIEF DESCRIPTION OF THE DRAWINGS

Embodiments of the present invention will now be described, by way of example only, with reference to the accompanying drawings.

DETAILED DESCRIPTION OF THE INVENTION

Figure 1:
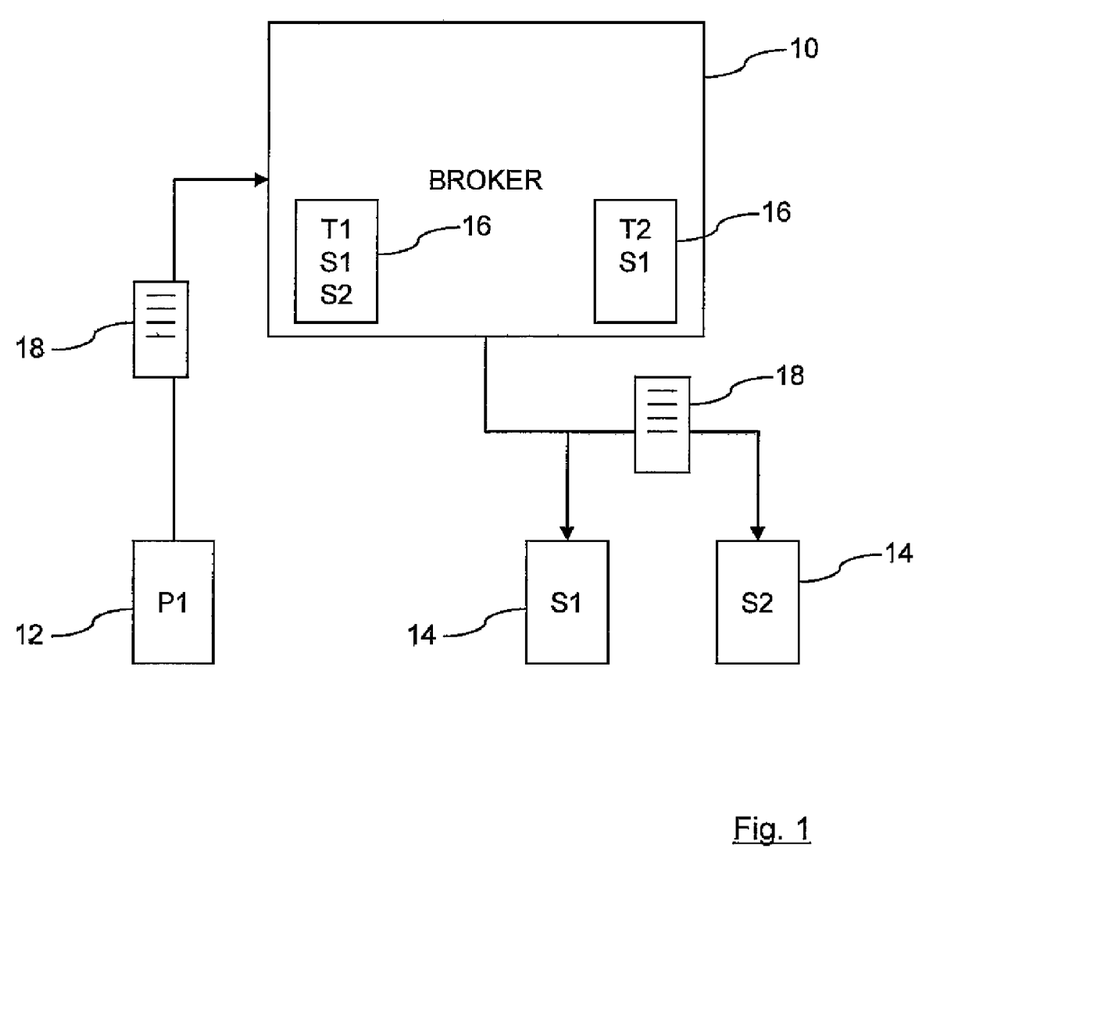
FIG. 1 is a schematic diagram of a publish/subscribe system.

An embodiment of a publish/subscribe system is shown in FIG. 1. The system includes a message broker 10, a publisher 12 and two subscribers 14. The message broker 10 is implemented, for example, at a server which is accessed via a suitable network. The publisher 12 and subscribers 14 can be any computing function that have the capability of connecting to the server running the broker 10. The publisher 12 and subscribers 14 may be desktop computers or mobile devices such as mobile phones or PDAs, for example. The designation of a connecting device as a publisher or subscriber is a logical status, and indeed, any connecting device can be both a publisher and a subscriber at different times.

The broker 10 maintains lists of topics 16, in this example being a first topic T1 and a second topic T2. Through known interfaces, connecting devices can discover the topics maintained by the broker 10, and can join and leave topics as desired. Connecting devices can also create topics, depending upon their status with respect to a suitable permission policy maintained by the broker 10. The subscriber S1 is subscribed to both topic T1 and topic T2. The broker 10 is said to have registered that subscriber 14 to these topics 16. In contrast, subscriber S2 is only a subscriber for topic T1. In general topics 16 will have a designation such as "games", which is more descriptive, and a device that is querying for the existence of topics 14 can also find out information about the topic 14.

Although FIG. 1 shows an illustrative embodiment of a publish/subscribe system, in reality, the broker 10 will be storing a very large number of topics with their subscribers. Each subscriber is stored by the broker 10 has an address. This address (such as an IP address) defines the routing to the relevant subscribing device.

A message 18 is shown in FIG. 1, which includes within it information about the topic to which it relates. In a simple system, each message 18 that is sent to the broker 10 will contain a header and a body. The header will comprise or consist of the topic designation (T1 for example), and the body will comprise the text of the message 18. The broker 10 provides routing of the message 18 to the relevant subscribers 14. In this case, since the message 18 relates to topic T1, then the broker 10 routs that message 18 to the two subscribers S1 and S2. In general, the broker 10 does not maintain any copy of the message 18, although this can be adapted through the administrative access to the broker 10. For example, the broker 10 may store the last message 18, on each topic 16, in order to send that message to any new subscriber to the topic 16.

Figure 2:
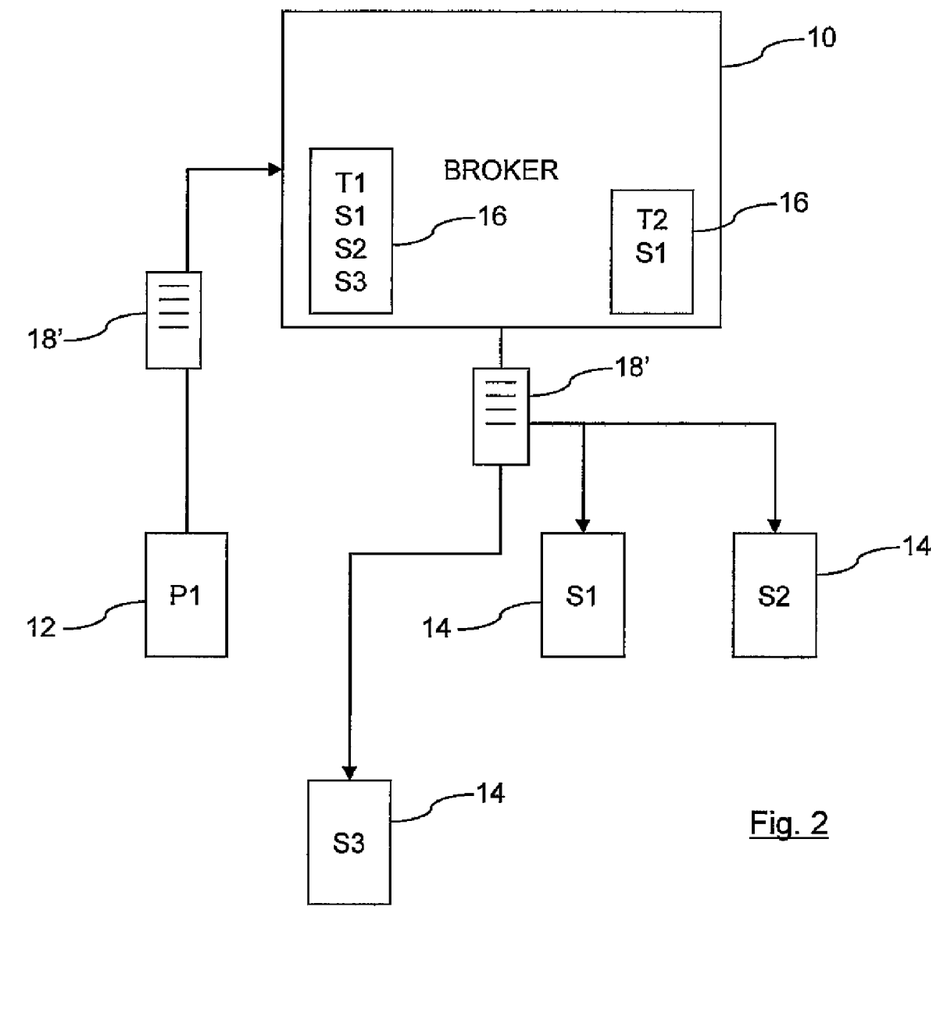
FIG. 2 is a further schematic diagram of the publish/subscribe system.

FIG. 2 shows what happens to the publish/subscribe system after a new subscriber S3 has subscribed to the topic T1. The new subscriber 14 will register with the broker 10 that they wish to subscribe to the topic T1, by sending a suitable administration message to the broker 10. As can be seen in FIG. 2, the broker 10 has registered the new subscriber in their list 16 with respect to that topic T1. When a new message 18' is received from the publisher 12, then the broker 10 distributes that message 18' to all of the current subscribers to that topic, being subscribers S1, S2 and S3. The lists 16 maintained by the broker 10 are constantly changing with subscribers joining and leaving specific topics 14.

Figure 3:
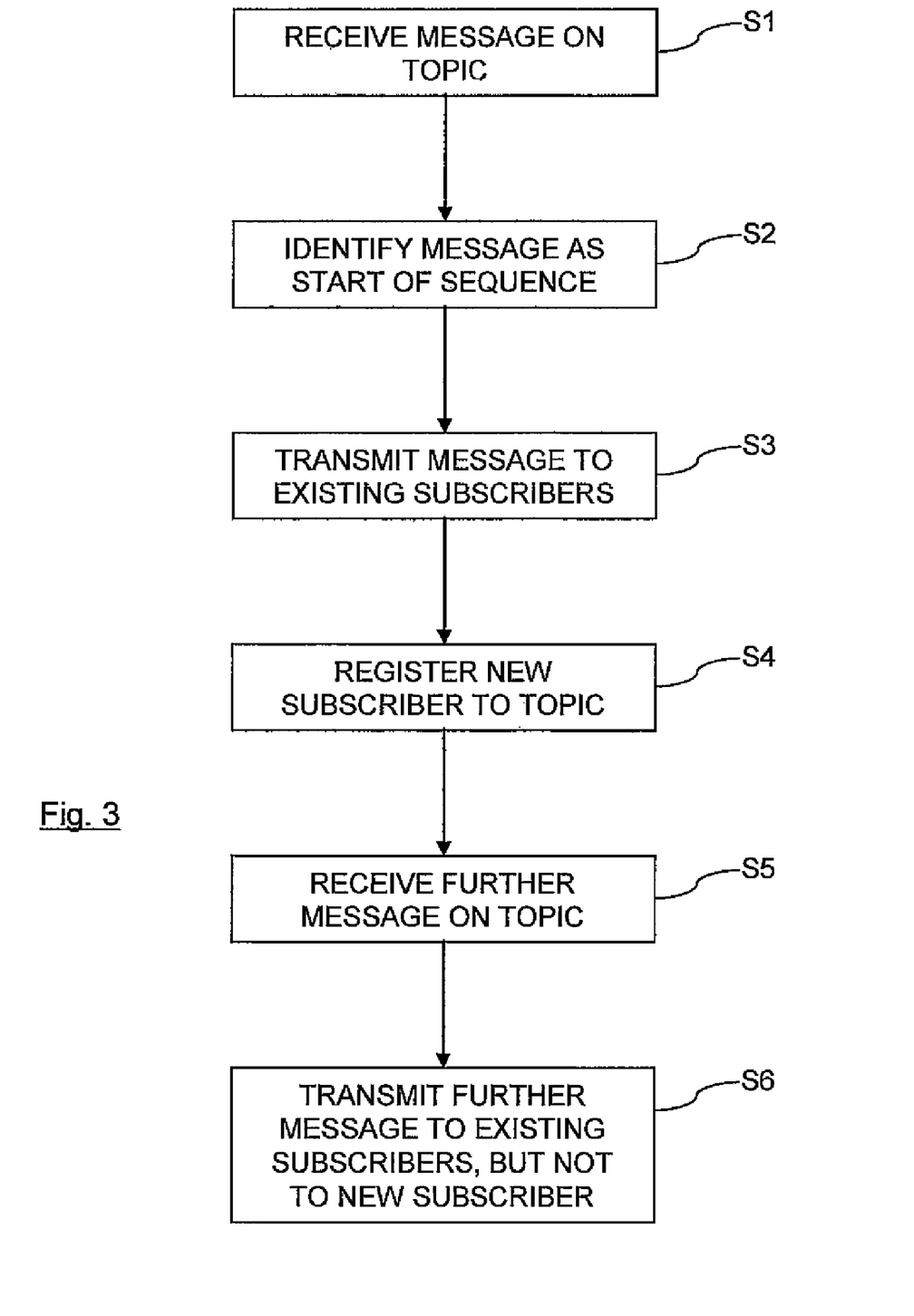
FIG. 3 is a flowchart of a method of operating a message broker of the publish/subscribe system.

However the operating of the standard messaging broker can be improved according to the flowchart of FIG. 3. This is because in a standard configuration, a new subscriber 14 may well start to receive messages 18 as soon as they subscribe to a topic 16, which may result in the new subscriber 14 receiving messages 18 that form part of a sequence, when they have not received the messages 18 that form the earlier part of the sequence. This later message content could conceivably be confusing to the latter subscriber 14, or could be meaningless. To deal with this situation, the message broker 10 of FIGS. 1 and 2 is configured to operate according to the process flowchart of FIG. 3.

The method of operating the publish/subscribe message broker comprises, firstly, step S1 receiving a message 18 on a topic 16 from a publisher 12, and secondly, step S2, identifying the message 18 as a start of a sequence of messages. The broker 10 has to identify the received message 18 as the start of a new sequence of messages. One scheme to achieve this is for the broker 10 to look at the content of the received message 18 for a marker (which may be explicit or implicit) within the content of the message 18, which indicates that the message 18 is the start of a new sequence. For example, the original publisher 12, of the message 18, may include within the body of the message a flag, according to a predetermined protocol, that indicates to the message broker 10 that the message 18 is the start of a new sequence of messages. If there is no flag, the message broker 10 may be configured to determine from the content of the message (through one or more processing algorithms) that the message 18 is the first of a sequence of messages. For example, if a topic 16 is maintained around the moves of one or more chess games, then the presence of, for example, "1. e4", or something similar will indicate that a new sequence has begun.

The identification of the message as the start of a new sequence may be based on something other then the content of the message 18. For example, the message broker 10 may be configured to identify a specific publisher 12 as the source of a new sequence of messages 18, in which case, the identification of the message 18, in step S2 is based on the location of the publisher 12. Other possibilities schemes implemented by the broker 10 may relate to the time at which the message was sent, either as an absolute time (the first message of the day), or as a relative time, for example, relating to the time a previous message was sent.

After receiving a message 18, at step S3, the message broker 10 is arranged to transmit the message 18 to the (one or more) existing subscribers 14 to the topic 16. At this point, the broker 10 is treating the received message exactly as if it was an ordinary message 18, and transmits that message 18 to all of the present subscribers 14 that are registered with the respective topic 16. Indeed if no new subscribers 14 join the topic 16 after the sequence of messages 18 has been begun, then no change is made in the operation of the message broker 10.

However, at step S4, the message broker 10 registers a new subscriber 14 to the topic 16. Once a new subscriber 14 is added to the topic 16, then at step S5, when receiving a further message 18 on the topic 16 from a publisher 12, the message broker 10 is arranged to transmit (step S6) the further message 18 to the existing subscribers 14 to the topic 16, but not to the registered new subscriber 14 to the topic 16. In effect, a subscriber 14 who joins a topic 16 after a new sequence has begun will not receive any further messages 18 on the topic 16. Only the existing subscribers 14 will receive the new messages 18.

The broker 10 is also arranged to receive a yet further message 18 on the topic 16, to identify the yet further message 18 as an end of the sequence of messages, and to transmit all future messages 18 on the topic 16 to the existing subscribers 14 to the topic 16, and to the registered new subscriber 14 to the topic 16. The broker 10 is implementing a procedure to close the sequence and return to a normal mode of operation. After the end message is detected to a sequence, then the new subscriber(s) 14 that were registered to the topic 16 while the sequence was ongoing, will now receive all new messages 18 that are published to the topic 16.

One way in which the broker 10 can be configured to implement the separation of the existing and new subscribers, is to create a new sub-topic, in the background, to manage the sequence. The publishers 12 and subscribers 14 are unaware of the existence of the sub-topic, but following the step (step S2) of identifying the message 18 as a start of a sequence of messages, the broker 10 is arranged to create a new topic corresponding to the sequence of messages and to subscribe the one or more existing subscribers 14 to the new topic.

Figure 4:
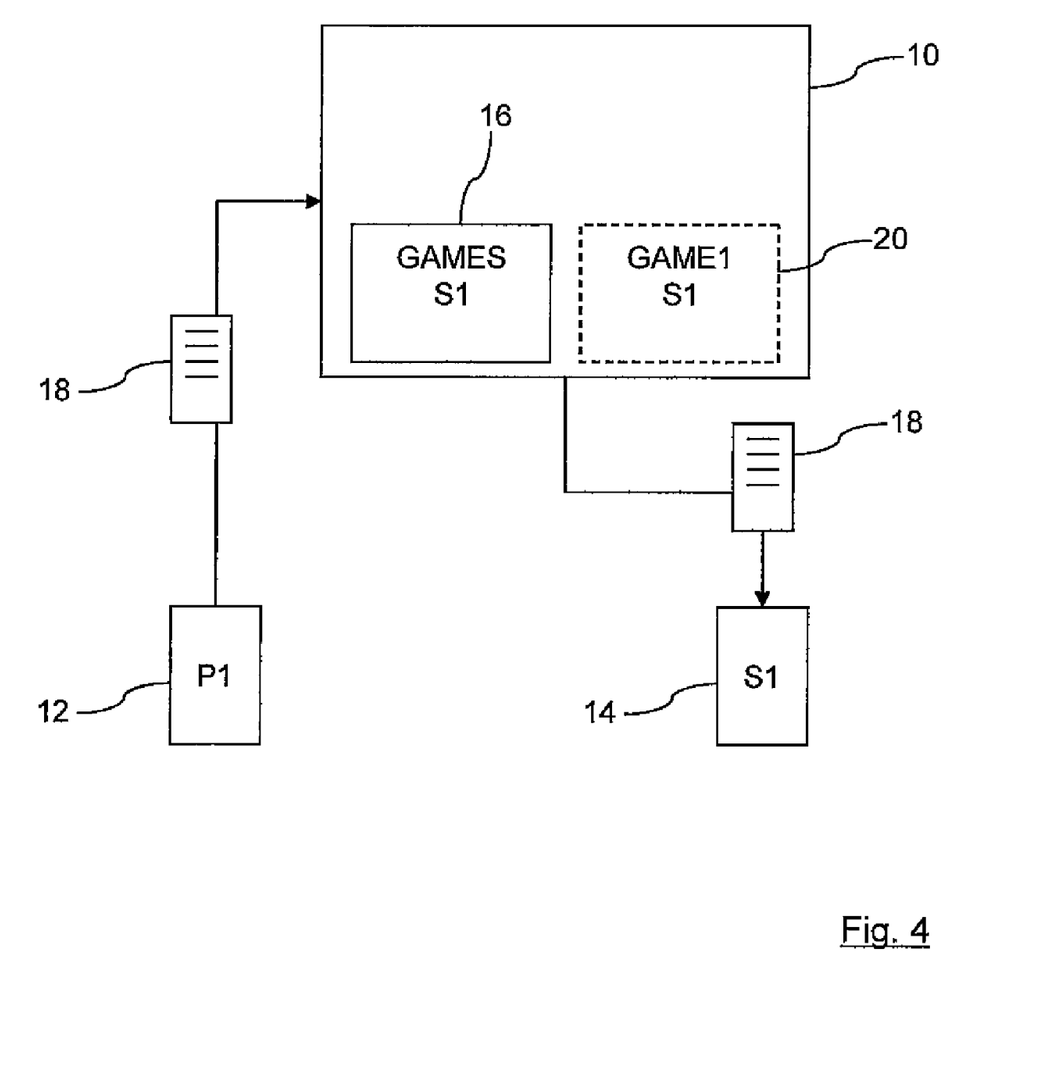
FIGS. 4 to 6 are schematic diagrams of a second embodiment of the publish/subscribe system.

An overview of how this might work is described as follows, with reference to FIG. 4. In FIG. 4, subscriber S1 has subscribed to the topic 16, which has the name "games". The broker 10 registers subscriber S1's subscription to the topic 16. Publisher P1 then publishes the first message 18 for Game1 to the topic "games". The broker 10 receives published message 18 and identifies this message 18 as the start of a new sequence of messages 18. The broker 10 will actually create a new sub-topic 20, and will publish the message 18 on the topic 20, entitled "games/game1". Before sending the published message 18, the broker 10 creates a subscription for all existing subscribers 14 (i.e., Subscriber S1) to the sub-topic 20. Subscriber S1 is now subscribed to topic "games" and sub-topic "games/game1" and receives the first published message 18 for Game1.

Figure 5:
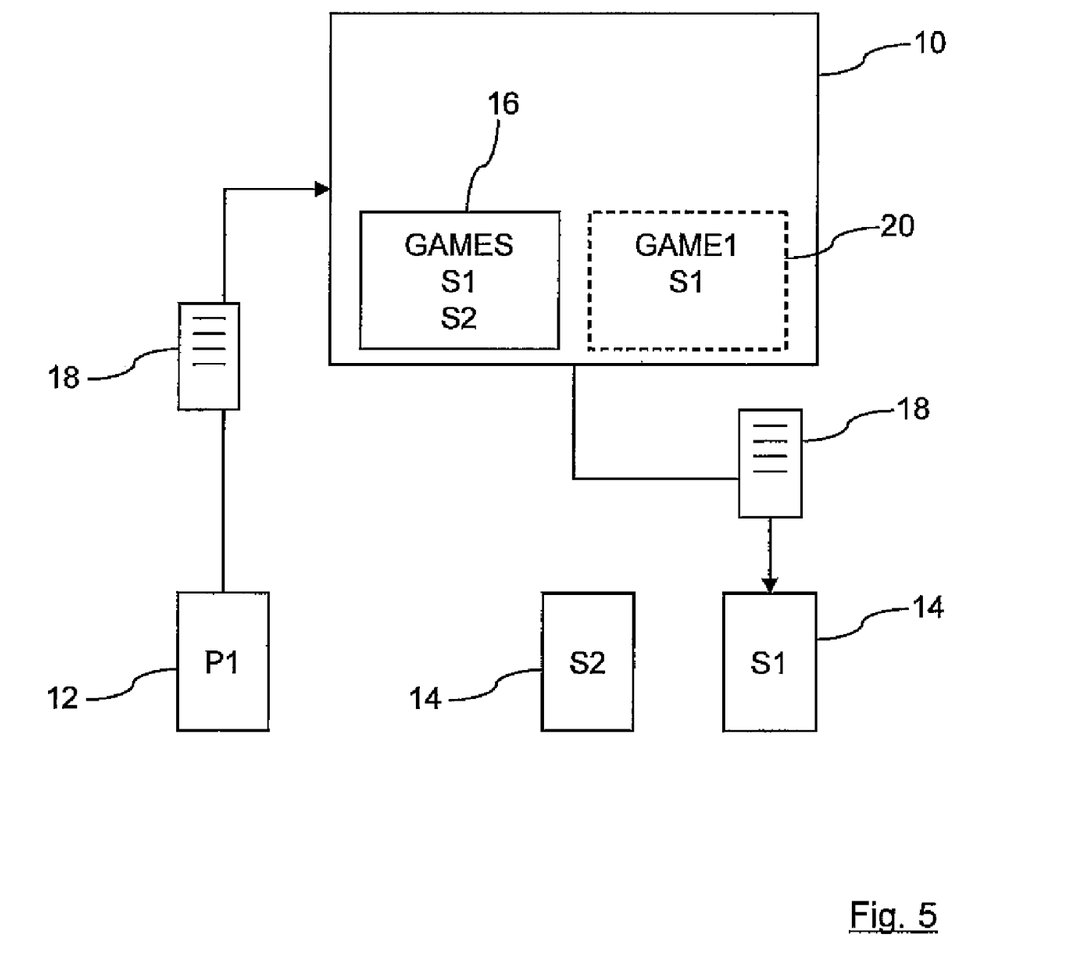

FIG. 5 shows what happens when a new subscriber S2 subscribes to topic "games". The broker 10 registers subscriber S2's subscription to the topic "games", but not to the sub-topic 20, which was already in existence and running when the new subscriber S2 was registered by the message broker 10. When publisher P1 publishes a further message 18 for Game1 to topic "games", then the broker 10 receives the published message 10 and publishes it to the topic "games/game1". The existing subscribers (S1) receive the new message 18, but not the new subscriber S2. The subscriber S1 receives the second message for Game1, Subscriber S2 does not.

Figure 6:
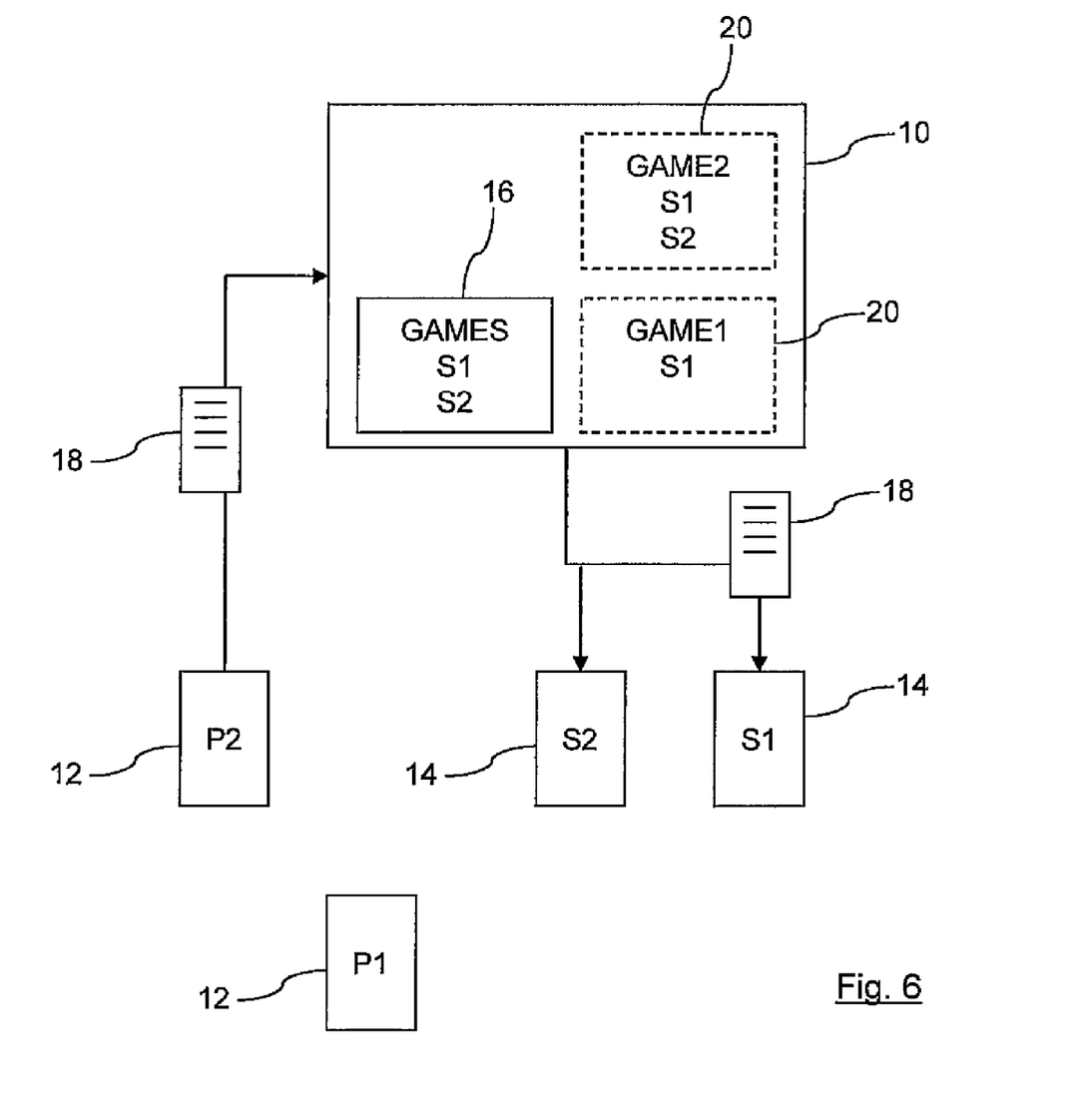

Nesting of the sequences of messages can occur. For example, it is possible for new sequences of messages to be started while a first sequence is ongoing, as a new sub-topic 20. This is illustrated in FIG. 6. In this example, publisher P2 publishes a first message 18 for Game2 to the topic "games". The broker 10 receives the published message 18 and identifies the message 18 as the start of a new sequence of messages 18, and therefore creates a second sub-topic 20. The broker 10 will actually publish the message 18 on topic "games/game2". Before sending the published message 18, the broker creates a subscription for all existing subscribers (i.e., subscriber S1 and subscriber S2) to sub-topic "games/game2". Subscriber S1 is now subscribed to topic "games" and sub-topics "games/game1" and "games/game2" and subscriber S2 is now subscribed to topic "games" and sub-topic "games/game2". Subscriber S1 and subscriber S2 both receive the first message 18 for Game2.

There are a variety of ways in which the name of the sub-topic 20 can be determined. For example, it could be administrable on the broker 10, or based on the timestamp of the message 18 indicating the start of a new sequence (indeed, since the name of the sub-topic 20 needn't be human-readable, the name can comprise any configuration of characters).

There are numerous ways in which this can be implemented and extended. Note that all scenarios are on a per topic basis, no allowance is made for message sequences on multiple topics (as far as any client is aware, different topics are obviously used by the broker).

There are many different ways for determining the start and end of a sequence of messages. For example, it is possible to split message sequences by publisher client ID. In this case the publisher is unaware of message sequences, and no change to current publisher implementations is needed. Another method can be to allow publishers to make an API call to the broker 10 to specify the start and end of message sequence (publisher can manage single message sequences at a time). A third alternative is to allow publishers to specify sequence ID in a message header, which allows publishers to manage multiple message sequences at a time, which can be interleaved. Note that a method for obtaining unique sequence IDs may be required from the broker to avoid conflict.

Determining when to redirect a subscriber from topics to sub-topics can be based upon a number of policies. For example, a subscriber is subscribed to all subsequently created sub-topics until they unsubscribe from the (main) topic from which the sub-topics are created. The subscriber is unaware of any redirection and is actually subscribed to multiple topics through a single known subscription, i.e., no change to current subscriber implementation. Alternatively, a subscriber is only subscribed to the next newly created sub-topic (at which point their main subscription is removed), again the subscriber is unaware of any redirection, i.e., no change to current subscriber implementation. The subscriber can select one of the above as part of the API subscription call, in which case the subscriber is aware that topic redirection takes place but not of the actual topics to which they are redirected.

In the embodiment of the invention that uses sub-topics 20, it is possible for a subscriber 14 to un-subscribe from the base topic 16 once a sub-topic 20 has been created. This provides a useful feature for the subscribers 14. For example, an extension to the operation of the message broker 10 would be to make the subscriber 14 aware of this feature, and allows a subscriber to instruct the message broker 10 effectively—"subscribe to the first transaction on the base topic, I don't want to know about future transactions, just the first one that comes along", which would be an instruction to the broker 10 to remove their subscription to the base topic 16, as soon as a new sub-topic 20 has been created and they have been automatically subscribed to it.

As with existing publish/subscribe systems, in order for a subscriber to maintain their real subscriptions following a disconnect, the subscriptions must be durable. A non-durable subscriber reconnecting will not be redirected to any previous sub-topics. When a subscriber unsubscribes from a main topic, all associated sub-topic subscriptions must also be removed. Note that these associations must be maintained by the broker.

Other extensions of the main configuration are possible. For example, the system can be arranged so that a publisher can specify the number of subscribers that should be redirected to a sub-topic. It may be useful for a publisher to specify that one (or n) and only one (or n) subscriber(s) receive a given sequence of messages.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appending claims.

The invention claimed is:

1. A method of operating a publish/subscribe message broker comprising:
    receiving a message on a topic from a publisher;
    identifying the message as a start of a sequence of messages;
    transmitting the message to one or more existing subscribers to the topic; and
    transmitting, in response to a new subscriber registering to the topic and a further message associated with the sequence being received on the topic from a publisher, the further message to the one or more existing subscribers to the topic, but not to the registered new subscriber to the topic.

2. The method according to claim 1, wherein
    the message is identified as the start of the sequence of messages based upon content of the message.

3. The method according to claim 1, further comprising:
    receiving a yet further message on the topic,
    identifying the yet further message as an end of the sequence of messages, and
    transmitting each further message on the topic not associated with the sequence to
        the one or more existing subscribers to the topic, and to
        the registered new subscriber to the topic.

4. The method according to claim 1, further comprising:
    creating, in response to receiving a message not associated with the sequence, a new topic associated with the message not associated with the sequence and
    subscribing the new subscriber to the new topic.

5. The method according claim 1, further comprising:
    following identifying the message as a start of a sequence of messages,
    creating a new topic corresponding to the sequence of messages and
    subscribing the one or more existing subscribers to the new topic.

6. The method according to claim 4, further comprising:
    determining, for a message received on the topic, whether to publish the message on the topic or on the new topic.

7. A publish/subscribe message broker arranged to:
    receive a message on a topic from a publisher;
    identify the message as a start of a sequence of messages;
    transmit the message to one or more existing subscribers to the topic; and
    transmit, in response to a new subscriber registering to the topic and in response to receiving on the topic from a publisher a further message associated with the sequence, the further message to the one or more existing subscribers to the topic, but not to the registered new subscriber to the topic.

8. The message broker according to claim 7, wherein
    the message is identified as the start of the sequence of messages based upon content of the message.

9. The message broker according to claim 7, wherein
    the message broker is further arranged to receive a yet further message on the topic, to identify the yet further message as an end of the sequence of messages, and to transmit each further message not associated with the sequence on the topic to the one or more existing subscribers to the topic, and to the registered new subscriber to the topic.

10. The method according to claim 7, wherein
    the message broker is further arranged to create, in response to receiving a message not associated with the sequence, a new topic associated with the message not associated with the sequence and subscribe the new subscriber to the new topic.

11. The message broker according to claim 7, wherein
    the message broker is arranged, following the identifying of the message as a start of a sequence of messages, to create a new topic corresponding to the sequence of messages and to subscribe the one or more existing subscribers to the new topic.

12. The message broker according to claim 10, wherein
    the message broker is further arranged to determine, for a message received on the topic, whether to publish the message on the topic or on the new topic.

13. A computer program product comprising a computer readable storage medium having stored therein computer usable program code for operating a publish/subscribe message broker, the computer usable program code, which when executed by a computer hardware device, causes the computer hardware device to perform:
    receiving a message on a topic from a publisher;
    identifying the message as a start of a sequence of messages;
    transmitting the message to one or more existing subscribers to the topic; and
    transmitting in response to a new subscriber registering to the topic and a further message associated with the sequence being received on the topic from a publisher, the further message to the one or more existing subscribers to the topic, but not to the registered new subscriber to the topic.

14. The computer program product according to claim 13, wherein
    the message is identified as the start of the sequence of messages based upon content of the message.

15. The computer program product according to claim 13, wherein the computer usable program code further causes the computer hardware device to perform:
    receiving a yet further message on the topic,
    identifying the yet further message as an end of the sequence of messages, and
    transmitting each further message not associated with the sequence on the topic to the one or more existing subscribers to the topic, and to the registered new subscriber to the topic.

16. The computer program product according to claim 13, wherein the computer usable program code further causes the computer hardware device to perform:
    creating, in response to receiving a message not associated with the sequence, a new topic associated with the message not associated with the sequence and
    subscribing the new subscriber to the new topic.

17. The computer program product according to claim 13, wherein the computer usable program code further causes the computer hardware device to perform:

following identifying of the message as a start of a sequence of messages, creating a new topic corresponding to the sequence of messages and subscribing the one or more existing subscribers to the new topic.

18. The computer program product according to claim 16, wherein the computer usable program code further causes the computer hardware device to perform:

determining for a message received on the topic, whether to publish the message on the topic or on the new topic.

19. An apparatus for use with a publish/subscribe message broker comprising:

a receiving component for receiving a message on a topic from a publisher;

an identifying component for identifying the message as a start of a sequence of messages;

a first transmitter for transmitting the message to one or more existing subscribers to the topic; and a second transmitter for transmitting, in response to a new subscriber registering to the topic and in response to receipt on the topic from a publisher of a further message associated with the sequence, the further message to the one or more existing subscribers to the topic, but not to the registered new subscriber to the topic.

\* \* \* \* \*